United States Patent [19]

Corley

[11] Patent Number: 5,137,990
[45] Date of Patent: Aug. 11, 1992

[54] HEAT-CURABLE POLYEPOXIDE-(METH)ACRYLATE ESTER COMPOSITIONS

[75] Inventor: Larry S. Corley, Houston, Tex.

[73] Assignee: Shell Oil Company, Houston, Tex.

[21] Appl. No.: 96,812

[22] Filed: Sep. 10, 1987

Related U.S. Application Data

[63] Continuation of Ser. No. 860,685, May 2, 1986, abandoned, which is a continuation of Ser. No. 743,881, Jun. 12, 1985, Pat. No. 5,100,229, which is a continuation of Ser. No. 584,413, Feb. 28, 1984, abandoned.

[51] Int. Cl.$^5$ .............................................. C08L 63/10
[52] U.S. Cl. ................................... 525/530; 525/502; 528/113; 528/124
[58] Field of Search ................ 525/530, 502; 528/113, 528/124

[56] References Cited

U.S. PATENT DOCUMENTS

| | | | |
|---|---|---|---|
| 3,940,537 | 2/1976 | Burns | 525/530 |
| 4,028,294 | 6/1977 | Brown et al. | 525/530 |
| 4,051,195 | 9/1977 | McWhorter | 525/530 |

FOREIGN PATENT DOCUMENTS 0681079 8/1979 U.S.S.R. .............................. 525/530

OTHER PUBLICATIONS

Lee and Neville, *Handbook of Epoxy Resins*, McGraw-Hill Book Co., New York, N.Y., 1982 Reissue, pp. 7-2 to 7-7, 8-1 to 8-3 & 8-6 to 8-11.

*Primary Examiner*—Robert E. Sellers

[57] ABSTRACT

The present invention is directed to a heat-curable composition comprising (1) a polyepoxide, (2) a polyacrylate or polymethyacrylate ester of a polyol, (3) an unsaturated aromatic monomer, (4) an aromatic amine, (5) a free-radical initiator, and optionally (6) an accelerator for the epoxy curing reaction.

25 Claims, No Drawings

HEAT-CURABLE POLYEPOXIDE-(METH)ACRYLATE ESTER COMPOSITIONS

This is a continuation of application Ser. No. 860,685, filed May 2, 1986, now abandoned, which is a continuation of application Ser. No. 743,881, filed Jun. 12, 1985, now U.S. Pat. No. 5,100,229, which is a continuation of application Ser. No. 584,413, filed Feb. 28, 1984, now abandoned.

FIELD OF THE INVENTION

The present invention is directed to a heat-curable composition comprising (1) a polyepoxide, (2) a polyacrylate or polymethacrylate ester of a polyol, (3) an unsaturated aromatic monomer, (4) an aromatic amine and (5) a free-radical initiator.

BACKGROUND OF THE INVENTION

Curable compositions comprising polyester resins and styrene have generally been epoxy polyester (vinyl ester) compositions wherein a portion of the polyester is replaced with styrene or other ethylenically unsaturated monomer. See, for example, U.S. Pat. No. 3,634,542.

Polyether resins and styrene blends are also known. These blends generally exhibit poor processability, short pot life, high viscosity and cure with conventional curing agents to produce products which do not exhibit good physical properties, such as high heat deflection temperatures and retention of physical properties at elevated temperatures. See, for example, U.S. Pat. No. 2,939,859 directed to a polyepoxide/styrene blend cured with peroxides and/or amines. While the compositions of U.S. Pat. No. 2,939,859 do exhibit a reduction of viscosity over an epoxy composition alone, the resulting products do not exhibit high heat deflection temperatures.

Other patents covering polyepoxide/styrene compositions include U.S. Pat. No. 3,099,638 and U.S. Pat. No. 3,009,898, which are directed to the use of anhydride curing agents, optionally in the presence of a peroxide and/or tertiary amine accelerator.

Epoxy/styrene blends which can be cured with a special curing agent/curing accelerator blend, e.g., an acid anhydride in combination with an onium salt, to yield products which exhibit improved physical properties, especially increased heat deflection temperatures and excellent retention of physical properties at elevated temperatures are disclosed and claimed in U.S. Pat. No. 4,284,753, issued Aug. 18, 1981.

Compositions of epoxy resin and (meth)acrylate esters of polyols are also known. See, for example, U.S. Pat. No. 4,010,289. The compositions of U.S. Pat. No. 4,010,289 are directed to a film coating which is cured via UV-radiation.

A composition has been found that exhibits high HDT's which comprises (1) an epoxy resin, (2) an ester of a ethylenically unsaturated monocarboxylic acid and styrene blend, (3) an aromatic amine and (4) a peroxide initiator.

SUMMARY OF THE INVENTION

The present invention is directed to an improved heat-curable epoxy composition, which when cured, yields compositions exhibiting improved physical properties such as increased heat deflection temperature (HDT), increased flexural strength and increased flexibility. More particularly, the invention provides a heat curable composition comprising: (1) a polyepoxide, (2) a blend of (a) an unsaturated aromatic monomer (styrene) and (b) at least one comonomer selected from the group consisting of (i) alkyl esters of ethylenically unsaturated acids, particularly monocarboxylic acids and (ii) poly(meth)acrylate esters of polyols, (3) an aromatic amine, (4) a peroxide initiator, and optionally (5) an accelerator for the epoxy curing reaction.

These epoxy blend compositions are suitable for use in sheet molding compositions (SMC), foam reservoir molding (FRM) compositions, and structural applications such as automotive parts, e.g., reaction injection molding (RIM) applications.

The present compositions are especially suitable for use in pultrusion processes to make structural components such as panels, tubing and rods, especially sucker rods.

DESCRIPTION OF THE PREFERRED EMBODIMENTS

It has now been found that heat curable compositions exhibiting improved physical properties, particularly improved heat deflection temperatures (HDT) are obtained from compositions of polyepoxides and blends of styrene with certain multifunctional (meth)acrylate esters using a combination curing agent-initiator system.

Accordingly, the present invention comprises a blend of (1) 100 parts by weight of a polyepoxide, especially a normally liquid polyepoxide, and preferably a glycidyl ether of a polyhydric phenol, (2) from about 5 to about 300 parts by weight of a blend comprising (a) from about 1 to 99 parts by weight of at least one unsaturated aromatic monomer, preferably styrene or substituted styrene and (b) from about 1 to 99 parts by weight of at least one (meth)acrylate ester selected from the group consisting of alkyl (meth)acrylate esters and poly(meth)acrylate esters of polyols, (3) a curing amount of an aromatic amine, and (4) a peroxide initiator, and (5) optionally, an epoxy curing accelerator.

Polyepoxides

The polyepoxides used to prepare the present compositions comprise those compounds containing at least one vicinal epoxy group; i.e., at least one

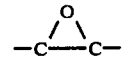

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. Nos. 3,356,624, 3,408,219, 3,446,762, and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

Other examples of suitable polyepoxides include the glycidyl ethers of novolac resins, i.e., phenol-aldehyde condensates. Preferred resins of this type are those disclosed in U.S. Pat. No. 2,658,885.

For most applications it is desirable to utilize an epoxy resin which is liquid or semi-liquid under the conditions of application. Accordingly, a blend of a liquid and solid epoxy resin may be employed. For some applications, a solid resin may be employed.

Unsaturated Aromatic Monomers

Examples of unsaturated aromatic monomers include the vinyl aromatic monomers such as styrene; alpha-methyl styrene; halo- and nitro-substituted styrenes such as vinyl toluene, chlorostyrene, bromostyrene, nitrostyrene; divinylbenzene, tertiary-butylstyrene; 2-vinyl pyridine; and vinyl naphthalene. Mixtures of unsaturated aromatic monomers may be employed. A very preferred mixture comprises styrene and divinylbenzene.

Comonomers

Suitable comonomers include the alkyl esters of ethylenically unsaturated acids such as acrylic acid, methacrylic acid, crotonic acid, alpha-phenylacrylic acid, alpha-cyclohexylacrylic acid, maleic acid, chloromaleic acid, itaconic acid, citraconic acid, fumaric acid, cyanoacrylic acid, methoxyacrylic acid, and the like. Very preferred acids are acrylic acid and methacrylic acid. Accordingly, suitable such esters include, methyl methacrylate, ethyl acrylate, butyl acrylate, butyl methacrylate, isobutyl methacrylate, 2,3-dibromopropyl methacrylate, 2-chloro-ethylmethacrylate, pentachlorophenyl methacrylate, and the like.

Very preferred comonomers include the polyacrylate and polymethacrylate esters of polyols containing more than one terminal acrylate or methacrylate group. These esters are the acrylic and methacrylic acid esters of aliphatic polyhydric alcohols such as, for example, the di- and polyacrylates and the di- and polymethacrylates of alkylene glycols, polyoxyalkylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are neopentyl glycol dimethacrylate, trimethylolpropane trimethacrylate, trimethylolpropane triacrylate, pentaerythritol triacrylate, and 1,3-butylene dimethacrylate.

Epoxy-Aromatic Monomer/Comonomer Blends

A very preferred range of composition of the polyepoxide and other monomers (aromatic monomers plus comonomers) will range from about 30% to 99% polyepoxide and from about 1% to about 70% other monomers as a weight basis. An especially preferred range is from about 50% to about 85% polyepoxide and from about 15% to about 50% other monomers.

The monomer blend will suitably comprise from about 5% to about 70% by weight of aromatic monomer and from about 30% to about 95% by weight of at least one comonomer ester.

Aromatic Amines

Suitable aromatic amines include the primary and secondary aromatic polyamines as well as their salts and adducts.

Examples of suitable aromatic amines include, among others, meta-phenylene diamine, 4,4'-methylene dianiline, 2,6-diaminopyridine, 4- chloro-ortho-phenylene diamine, diamino diphenyl sulfone, 2,4-bis-(p-aminobenzyl)aniline, 4,4'-oxydianiline, 4-bromo-1,3-diaminobenzene, 1,3-diamino-2,4-diethyl-6-methylbenzene, 2,4-toluenediamine, etc.

The amount of aromatic amine will generally be a curing amount. Operable ranges of aromatic amine are from about 0.5 to about 1.75 chemical equivalents per chemical equivalent of polyepoxide. Of course, mixtures of aromatic amines may be employed.

Free Radical Curing Agents

Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, and the like. Particularly preferred catalysts include the dialkyl peroxides, tertiary alkyl hydroperoxides, alkyl esters of peroxycarboxylic acids and particularly those of the above noted groups which contain no more than 18 carbon atoms per molecule and which have a half-life of at least one hour at 125° C.

An especially useful peroxide is 2,5-dimethyl-2,5-bis(-tertiary-butylperoxy) hexane.

It will be appreciated that the amount of free-radical catalyst (curing agent) will vary over a broad range depending upon the amount of the particular vinyl monomer used, type of peroxide and end-use properties, etc. In general, an effective or curing amount is employed. One skilled in the art would simply adjust the amounts of a particular peroxide to suit his process conditions. Such adjustments are made in one or two runs knowing the temperatures, half-lives, etc.

Curing Accelerators

The present compositions can optionally contain an accelerator to accelerate the cure of the epoxy resin by the aromatic amine. Useful accelerators include several classes of compounds known to the art to accelerate aromatic amine cure of epoxy resins. These include, among others, carboxylic acids such as acetic acid, benzoic acid, and salicylic acid; phenolic compounds such as phenol, p-nitrophenol, 2,4-dinitrophenol, 2,4-dichlorophenol, bisphenol A, o-cresol, resorcinol, and oligomeric condensates of phenolic compounds with aldehydes or ketones; imidazoles such as imidazole, 2-methylimidazole, 2-ethyl-4-methylimidazole, 1-benzyl-2-methylimidazole, 1-(2-cyanoethyl)-2-undecylimidazole, and 2-phenyl-4-methyl-5-(hydroxymethyl)imidazole; borate esters such as trimethyl borate, tricresyl borate, and trimethoxyboroxine; titanates such as triethanolamine titanate; metal complexes and salts such as stannous octoate, aluminum triisopropoxide, zinc acetylacetonate, chromium acetylacetonate, ferrous naphthenate, and di(sec-butoxy)aluminum ethyl acetoacetate complex; strong acids such as sulfuric acid and p-toluenesulfonic acid; and boron trifluoride complexes such as boron trifluoride monoethylamine complex and boron trifluoride diethyl etherate. The class comprising strong acids and boron trifluoride complexes constitutes a preferred class. Boron trifluoride complexes are particularly preferred.

The amount of accelerator or co-accelerator may vary within wide limits from about 0.001 to about 10 parts per hundred by weight of polyepoxide (phr), and preferably from about 0.01 to 5.0 phr, and more preferably 0.05 to 2.0 phr.

The present compositions may be prepared by various techniques. If, for example, the instant compositions are to be utilized within a short time, they can be prepared by simply mixing all the components, adding the customary additives such as fillers, reinforcement fibers, pigments, flame retardant agents, etc. and then molding and curing the resulting composition.

Under certain conditions, it may be desirable to utilize a two-package system wherein the epoxy-styrene comonomer blend is one package and the other package comprises the curing agents. The accelerators may be incorporated into either package. Under other conditions, it may be desirable to mix the epoxy curing agent (with or without accelerators) into the styrene and/or comonomer for subsequent reaction with the polyepoxide in the presence of the peroxide. Various other modifications will become apparent to one skilled in the art.

As noted hereinbefore, other materials may be mixed or added, including, plasticizers, stabilizers, extenders, oils, resins, tars, asphalts, pigments, reinforcing agents, thixotropic agents, antioxidants, and the like.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or sheets and the material formed into the desired object and cured. A particularly preferred application is in pultrusion processes to make structural components such as panels, tubing and rods, especially sucker rods.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis(4-hydroxyphenyl)propane having an epoxide equivalent weight of 180–195 and an average molecular weight of about 380.

Epoxy Resin B is a liquid glycidyl polyether of 2,2-bis(4-hydroxyphenyl)propane having an epoxide equivalent weight of 190–210 and an average molecular weight of about 400.

Epoxy Resin C is a solid glycidyl polyether prepared by glycidation of an oligomeric condensate of orthocresol with formaldehyde. Epoxy Resin C has an epoxide equivalent weight of 210–250 and a number average molecular weight of about 550.

C103 is (Upjohn) Curithane 103, an aromatic polyamine consisting primarily of 4,4'-methylenedianiline with smaller amounts of other aniline-formaldehyde condensation products.

BABA is (DuPont) 2,4-bis(p-aminobenzyl)aniline, a mixture consisting primarily of this component with smaller amounts of other aniline-formaldehyde condensation products.

TMPTMA is trimethylolpropane trimethacrylate.

NPGDMA is neopentylglycol dimethacrylate.

DVB-55 is a mixture of 55% divinylbenzene and 45% other materials, mostly vinylethylbenzenes, sold by American Hoechst.

Y is EPON® CURING AGENT Y, a proprietary aromatic amine curing agent of Shell Chemical Company.

Z is EPON® CURING AGENT Z, a proprietary aromatic amine curing agent of Shell Chemical Company.

L101 is Lupersol 101, the Pennwalt brand of 2,5-bis(t-butylperoxy)-2,5-dimethylhexane.

EXAMPLE 1

A series of mixtures were prepared of Epoxy Resin B with supercooled liquid Y and Z, styrene, TMPTMA and Lupersol 101 (Table 1). Brookfield viscosity at 25° C. and gel time at 150° C. were determined for some of the mixtures. Each mixture was then poured into aluminum molds with a linear cavity ¼" square to form bars. Some of the mixtures were also poured between glass plates ⅛" apart to form sheet castings. The bars and sheet castings were cured according to a number of cure schedules as shown in Table 1. Mechanical properties of the cured materials are shown in Table 1. Experiments 1, 2, 3, 12, and 13 are comparative experiments.

One can see from Table 1 that undiluted Epoxy Resin B mixed with Y had an initial viscosity of 3.85 Pa.s, considerably higher than the 1 Pa.s value considered the maximum desirable for filament winding or pultrusion. Dilution with 10 or 25 phr of styrene (Experiments 2 and 3) reduced viscosity to well below 1 Pa.s but caused a considerable drop in heat distortion temperature (HDT). When the multifunctional acrylic monomer TMPTMA was used as a codiluent (Experiments 4–10), however, a viscosity well below 1 Pa.s was obtained with little or no drop in HDT in comparison with the undiluted system.

When Z instead of Y was used as the curing agent (Experiments 11–15), results paralleled those of Y. Styrene dilution reduced HDT, while dilution with a TMPTMA-styrene mixture with a relatively high ratio of TMPTMA to styrene produced little or no loss in HDT.

TABLE 1

AROMATIC AMINE CURED EPOXY RESIN SYSTEMS DILUTED WITH CROSSLINKABLE OLEFINIC MONOMER MIXTURES[a]

| Experiment No. | Curing Agent, phr[a,b] | Monomers, phr[a,c] | Lupersol 101, phr[a] | Initial Mixed Viscosity, Pa·s (25° C.) | Gel Time, 150° C. Cure Plate, sec | Cure Cycle | HDT, 264 psi, °C. | R.T. Tensile Strength, MPa |
|---|---|---|---|---|---|---|---|---|
| 1 | Y(25) | | | 3.85 | >300 | 2 hr @ 80° C. 2 hr @ 150° C. | 155,155 | 61 |
| 2 | Y(25) | Styrene (10) | 0.5 | 0.735 | >300 | 2 hr @ 150° C. | 132,132 | 65 |
| 3 | Y(25) | Styrene (25) | 0.5 | 0.158 | >300 | 2 hr @ 150° C. | 127,127 | 64 |
| 4 | Y(25) | TMPTMA (15) Styrene (10) | 0.4 | 0.950 | >600 | 6 hr @ R.T. 2 hr @ 150° C. | 149 | 88 |
| 5 | Y(25) | TMPTMA (15) Styrene (10) | 0.4 | 0.875 | 570 | 6 hr @ R.T. 2 hr @ 150° C. | | |
| 6 | Y(25) | TMPTMA (15) Styrene (30) | 0.5 | 0.100 | >300 | 2 hr @ 80° C. 2 hr @ 150° C. | 144,146 | 64 |
| 7 | Y(25) | TMPTMA (20) Styrene (10) | 0.4 | 0.480 | 581 | 7 hr @ R.T. 2 hr @ 150° C. | 148,151 | 78 |
| 8 | Y(25) | TMPTMA (30) Styrene (20) | 0.4 | 0.124 | >650 | 7 hr @ R.T. 2 hr @ 150° C. | 145,150 | 67 |
| 9 | Y(25) | TMPTMA (30) Styrene (20) | 0.5 | 0.165 | >300 | 2 hr @ 80° C. 2 hr @ 150° C. | 154,156 | 57 |
| 10 | Y(25) | TMPTMA (60) Styrene (40) | 0.5 | 0.150 | >300 | 2 hr @ 80° C. 2 hr @ 150° C. | 150,153 | 31 |
| 11 | Z(20) | | | | 380 | 1 hr @ R.T. 30 min @ 100° C. 1½ hr @ 150° C. | 141,142 | |
| 12 | Z(20) | Styrene (25) | 0.5 | | >420 | Same | 128,131 | |
| 13 | Z(20) | TMPTMA (15) Styrene (30) | 0.5 | | >420 | Same | 125,131 | |
| 14 | Z(20) | TMPTMA (30) Styrene (20) | 0.5 | | >420 | Same | 141,141 | |
| 15 | Z(20) | TMPTMA (60) Styrene (40) | 0.5 | | >420 | Same | 145,148 | |

| Experiment No. | R.T. Tensile Modulus, MPa | R.T. Tensile Elongation, % | 149° C. Tensile Strength, MPa | 149° C. Tensile Modulus, MPa | 149° C. Tensile Elongation, % | Dynamic Mechanical Data Tg, °C. (tan δ peak) | Temp. for G' = 300 MPa °C. |
|---|---|---|---|---|---|---|---|

TABLE 1-continued

AROMATIC AMINE CURED EPOXY RESIN SYSTEMS
DILUTED WITH CROSSLINKABLE OLEFINIC MONOMER MIXTURES[a]

| | | | | | | | |
|---|---|---|---|---|---|---|---|
| 1 | 2580 | 4.9 | 22.4 | 1510 | 3.1 | 171 | 158 |
| 2 | 2490 | 5.1 | 10.3 | 380 | 23.1 | 160 | 148 |
| 3 | 2670 | 5.7 | | | 20 | 114,163[d] | 148 |
| 4 | 2900 | 5.4 | | | | 173 | 163 |
| 5 | | | | | | | |
| 6 | 2590 | 4.7 | 23.3 | 1350 | 11.3 | 170 | 160 |
| 7 | 2830 | 4.7 | | | | 176 | 167 |
| 8 | 2490 | 3.3 | | | | 174 | 165 |
| 9 | 2500 | 3.5 | 23.4 | 1530 | 10.6 | 172 | 164 |
| 10 | 3550 | 1.0 | 27.3 | 1830 | 6.2 | 172 | 170 |
| 11 | | | | | | | |
| 12 | | | | | | | 162 | 152 |
| 13 | | | | | | 110,170[d] | |
| 14 | | | | | | 156 | 143 |
| 15 | | | | | | 163 | 143 |
|  | | | | | | 167 | 166 |

[a]Base Formulation:  
　Epoxy Resin B　　　100 parts  
　Amine Curing Agent　As above  
　Olefinic Monomers　As above  
　Lupersol 101　　　As above [2,5-bis(t-butylperoxy)-2,5-dimethylhexane]

[b]Y = EPON Curing Agent Y  
Z = EPON Curing Agent Z  
[c]TMPTMA = trimethylolpropane trimethacrylate 1,3-BDMA = 1,3-butylene dimethacrylate  
[d]First Tg is that of polystyrene phase; second Tg is that of resin phase.

EXAMPLE 2

Three different aromatic amine mixtures were melted and mixed with TMPTMA to form viscous solutions. These solutions were then each mixed at room temperature with a solution of Epoxy Resin A in styrene containing Lupersol 101. The viscosity at 25° C. and the gel times at 150° C. and 171° C. of each resin—curing agent mixture were determined. Each mixture was then poured into aluminum molds with a linear cavity ¼" square to form bars and between glass plates ⅛" apart to form sheet castings. The bars and sheet castings were cured according to two cure schedules: 2 hours at 150° C. and 2 hours at 175° C. Mechanical properties of the cured materials are shown in Table 2.

EXAMPLE 3

Two of the commercial aromatic amine mixtures used in the previous example were melted and mixed at different levels with TMPTMA to form a series of viscous liquid curing agent mixtures. These solutions were then each mixed at room temperature with a solution of Epoxy Resin B in styrene containing Lupersol 101. In one case a catalyst for the epoxy-amine reaction was added. The room temperature viscosity of each mixture and the gel time at 150° C. were determined. Bar and sheet castings were prepared as in Example 1 and cured for 2 hours at 150° C. Mechanical properties of the castings are shown in Table 3.

TABLE 2

Epoxy Resin Systems Diluted with Styrene and TMPTMA and Cured with Different Aromatic Amines

| Exp. # | Amine[a] Pbw | Init. Visc. 25° C. Pa·s | Gel Time 150° C., Sec. | Gel Time 171° C., Sec. | Cure[b] Cycle | HDT, 264 psi, °C. | Flex.[c] Str., MPa | Flex.[c] Mod., MPa |
|---|---|---|---|---|---|---|---|---|
| 1 | BABA (28) | 0.713 | 600 | 396 | A | 158 | 130 | 3290 |
| 2 | BABA (28) | | | | B | 174 | 92 | 3270 |
| 3 | C103 (28) | 0.340 | 625 | 282 | A | 160 | 123 | 3150 |
| 4 | C103 (28) | | | | B | 162 | 121 | 3130 |
| 5 | Y (25) | 0.320 | 782 | 350 | A | 150 | 142 | 3240 |
| 6 | Y (25) | | | | B | 156 | 129 | 3140 |

| Exp. # | Flex.[d] Str., MPa | Flex.[d] Mod., MPa | Ten.[c] Str., MPa | Ten.[c] Mod., MPa | Ten.[c] Elong., % | Ten.[d] Str., MPa | Ten.[d] Mod., MPa | Ten.[d] Elong., MPa |
|---|---|---|---|---|---|---|---|---|
| 1 | 48 | 1710 | 52 | 3410 | 1.8 | 28 | 1560 | 3.4 |
| 2 | 60 | 1790 | 64 | 3260 | 2.7 | 34 | 1520 | 5.4 |
| 3 | 43 | 1670 | 86 | 3210 | 4.5 | 25 | 1420 | 8.0 |
| 4 | 49 | 1720 | 63 | 3010 | 3.5 | 29 | 1440 | 7.5 |
| 5 | 34 | 1380 | 79 | 3120 | 3.7 | 21 | 1380 | 13.8 |
| 6 | 48 | 1710 | 90 | 2815 | 6.0 | 29 | 1520 | 14.8 |

[a]Base Formulation:

| (Resin Component) | Parts by weight | (Curing Agent Component) | Parts by weight |
|---|---|---|---|
| Epoxy Resin A | 100 | Aromatic Amine | Variable |
| Styrene | 14 | TMPTMA | 21 |
| L101 | 0.5 | | |

[b]Cure cycle A - 2 hours at 150° C.; Cure cycle B - 2 hours at 175° C.  
[c]Room temperature.  
[d]149° C.

TABLE 3

Epoxy Systems Diluted with Styrene and TMPTMA and Cured with Different Levels of Aromatic Amines

| Exp. # | C103 (parts) (a) | BABA (parts) (a) | Init. mixed Visc. at R.T., Pa·s | 150° C. Gel Time, Sec. | HDT, 264 psi (°C.) | Tg, tan δ peak (Rheometrics mech. Spectrometer) | R.T. Tens. Str., MPa | R.T. Tens. Mod., MPa | R.T. Tens. Elong., % | 149° C. Tens. Str., MPa | 149° C. Tens. Mod., MPa | 149° C. Tens. Elong., % |
|---|---|---|---|---|---|---|---|---|---|---|---|---|
| 1 | 13 | 10.9 | 1.02 | >420 | 125 | 157 | 16 | 3360 | 0.5 | | | |
| 2 | 14.2 | 11.8 | 0.95 | >420 | 152 | 178 | 29 | 2820 | 1.0 | 21 | 1250 | 4.5 |
| 3 | 15.2 | 12.8 | 1.06 | 439 | 162 | 186 | 38 | 3290 | 1.4 | 26 | 1660 | 3.1 |
| 4 | 16.3 | 13.7 | 1.21 | 400 | 157 | 179 | 41 | 2620 | 1.8 | 27 | 1600 | 6.3 |
| 5 | 17.4 | 14.6 | 1.30 | 371 | 156 | 176 | 31 | 2850 | 1.1 | 20 | 1335 | 4.6 |
| 6 (b) | 15.2 | 12.8 | 0.96 | >420 | 166 | | | | | | | |
| 7 (c) | 15.2 | 12.8 | 1.19 | 307 | 151 | 178 | 23 | 2670 | 1.1 | 20 | 1335 | 2.8 |

(a) Base formulation:

| (Resin Component) | Parts | (Curing Agent Component) | Parts |
|---|---|---|---|
| Epoxy Resin B | 100 | C103 | As above |
| Styrene | 14 | BABA | As above |
| L101 | 0.5 | TMPTMA | 14 (except for Exp. #6) |

(b) Contained 21 parts TMPTMA.
(c) Contained 1 part diisopropoxy bis(acetylacetonato)titanium as accelerator.

EXAMPLE 4

Different levels of TMPTMA were mixed with a constant quantity of melted C103 and BABA (Table 4) to produce a series of viscous liquid curing agent mixtures. These solutions were then mixed at room temperature with respective solutions of Epoxy Resin B in varying amounts of styrene containing Lupersol 101. Bar and sheet castings were prepared as in Example 1 and cured by two different cure cycles (Table 4). Mechanical properties of the castings are shown in Table 4.

EXAMPLE 5

Different levels of TMPTMA were mixed with melted C103 and BABA (Table 5) to produce a series of viscous liquid curing agent mixtures. Different amounts of Epoxy Resin B, Epoxy Resin C, styrene, and Lupersol 101 were combined in jars and shaken until the Epoxy Resin C had dissolved to form homogeneous liquid diluted resin mixtures. The respective resin and curing agent mixtures were then mixed together at room temperature. Bar and sheet castings were prepared as in Example 1 and cured by two different cure cycles (Table 5). Properties of the cast specimens are shown in Table 5.

TABLE 4

Aromatic Amine Cured Epoxy Systems Diluted with Different Levels of Styrene and TMPTMA[a]

| Notebook # | TMPTMA (parts) (a) | Styrene (parts) (a) | Cure cycle (b) | HDT, 264 psi (°C.) | R.T. Tens. Str., MPa | R.T. Tens. Mod., MPa | R.T. Tens. Elong., % | 149° C. Tens. Str., MPa | 149° C. Tens. Mod., MPa | 149° C. Tens. Elong., % |
|---|---|---|---|---|---|---|---|---|---|---|
| 15157-155-1A | 14 | 14 | A | 160 | | | | | | |
| -1B | 14 | 14 | B | 166 | 65 | 2610 | 4.0 | 24 | 1430 | 5.3 |
| -2A | 14 | 28 | A | 150 | | | | | | |
| -2B | 14 | 28 | B | | 43 | 2730 | 1.9 | 22 | 1260 | 8 |
| -3A | 28 | 14 | A | 166 | | | | | | |
| -3B | 28 | 14 | B | 164 | 68 | 2730 | 4.0 | 31 | 1720 | 6.6 |
| -4A | 14 | 0 | A | 160 | | | | | | |
| -4B | 14 | 0 | B | 164 | 39 | 2730 | 1.7 | 25 | 1460 | 3.0 |
| -5A | 0 | 14 | A | 146 | | | | | | |
| -5B | 0 | 14 | B | 150 | 71 | 2690 | 4.7 | 18 | 980 | 7.1 |
| -6A | 24 | 24 | A | 166 | | | | | | |
| -6B | 24 | 24 | B | 163 | 30 | 2790 | 1.2 | 28 | 1550 | 8.2 |
| -7A | 4 | 24 | A | | | | | | | |
| -7B | 4 | 24 | B | | 64 | 2850 | 3.4 | 17 | 1010 | 11 |
| -8A | 4 | 4 | A | 162 | | | | | | |
| -8B | 4 | 4 | B | 164 | 53 | 2660 | 2.6 | 24 | 1480 | 7.0 |
| -9A | 24 | 4 | A | 164 | | | | | | |
| -9B | 24 | 4 | B | 170 | 58 | 2750 | 2.9 | 29 | 1590 | 7.3 |
| -10A | 14 | 14 | A | 160 | | | | | | |
| -10B | 14 | 14 | B | 158 | 50 | 2750 | 3.0 | 22 | 1440 | 4.3 |

[a] Base Formulation:

| (Resin Component) | Parts | (Curing agent Component) | Parts |
|---|---|---|---|
| Epoxy Resin B | 100 | C103 | 14.7 |
| Styrene | As above | BABA | 12.3 |
| L101 | 0.5 | TMPTMA | As above |

(b) Cure cycle A - 2 hours at 150° C.; Cure cycle B = 1 hour at 150° C. followed by 2 hours at 175–180° C.

TABLE 5

Aromatic Amine Cured Epoxy Resin Blends Containing Epoxy Novolac Diluted with Styrene and TMPTMA (a)

| | Epoxy | Epoxy Resin | | Init. Mixed Visc. | 171° C. Gel |

TABLE 5-continued

Aromatic Amine Cured Epoxy Resin Blends Containing Epoxy Novolac Diluted with Styrene and TMPTMA (a)

| Exp. # | Resin B, % | C, % | Styrene, % | L101, % | C103, % | BABA, % | TMPTMA, % | at 24° C., Pa·s | Time, Sec. |
|---|---|---|---|---|---|---|---|---|---|
| 1 | 63.13 | 0 | 9.47 | 0.25 | 9.60 | 8.08 | 9.47 | 0.875 | 247 |
| 2 | 63.13 | 0 | 9.47 | 0.25 | 9.60 | 8.08 | 9.47 | 0.875 | |
| 3 | 39.87 | 15.95 | 14.53 | 0.21 | 8.09 | 6.81 | 14.53 | 0.640 | 248 |
| 4 | 39.87 | 15.95 | 14.53 | 0.21 | 8.09 | 6.81 | 14.53 | | |
| 5 | 22.64 | 27.17 | 18.66 | 0.23 | 6.87 | 5.79 | 18.64 | 0.530 | 247 |
| 6 | 22.64 | 27.17 | 18.66 | 0.23 | 6.87 | 5.79 | 18.64 | | |
| 7 | 9.86 | 35.51 | 21.71 | 0.20 | 5.98 | 5.04 | 21.69 | 0.505 | 100–248 |
| 8 | 0 | 41.86 | 24.19 | 0.19 | 5.29 | 4.45 | 24.02 | 0.475 | 52–174 |

| Exp. # | Cure Cycle (b) | HDT, 264 psi (°C.) | Tg, tan δ peak (Rheometrics mech. Spectrometer) | R.T. Tens. Str., MPa | R.T. Tens. Mod., MPa | R.T. Tens. Elong., % |
|---|---|---|---|---|---|---|
| 1 | A | 147 | | | | |
| 2 | B | 168 | 196 | 30 | 2100 | 1.6 |
| 3 | A | 164 | | | | |
| 4 | B | 178 | 210 | 32 | 2560 | 1.2 |
| 5 | A | 178 | | | | |
| 6 | B | 184 | 230 | | | |
| 7 | B | | 235 | | | |
| 8 | B | | 240 | | | |

(a) Base formulation:

| (Resin Component) | % of total formulation | (Curing agent Component) | % of total formulation |
|---|---|---|---|
| Epoxy Resin B | As above | C103 | As above |
| Epoxy Resin C | As above | BABA | As above |
| Styrene | As above | TMPTMA | As above |
| L101 | As above | | |

(b) Cure cycle A = 2 hours at 150° C.; Cure cycle B = 1 hour at 150° C. followed by 2 hours at 175–180° C.

EXAMPLE 6

Melted C103 and BABA were mixed with TMPTMA (Table 5) to produce a viscous liquid curing agent mixture. Epoxy Resin B, styrene, and Lupersol 101 were mixed with different accelerators (Table 6) and shaken to form solutions or suspensions of accelerator in diluted resin. The respective accelerated resin and curing agent mixtures were then mixed together at room temperature. Gel time was determined on a hot plate at 149° C. Brookfield viscosity was determined periodically for the resin-curing agent mixtures. After the mixtures had stood at room temperature for several hours, they were used to make bar castings as in Example 1. The bar castings were cured for 2 hours at 150° C. HDT values for the castings are shown in Table 6.

TABLE 6

Borates and Metal Complexes as Accelerators for Diluted Aromatic Amine-cured Epoxy Systems[a]

| Experiment # | Accelerator (phr)[b] | Time (Hours) - Brookfield (Viscosity (mPa·s) | Pot Life, Hr.[d] | 149° C. Gel Time, Sec. | 171° C. Gel Time, Sec. | HDT, °C. |
|---|---|---|---|---|---|---|
| 1 | None | 0-1137, 2-1850, 4-1950 | | 550 | | 159, 160 |
| 2 | Stannous octoate (1.0) | 0-1012, 2-4350, 4-13900 | 1.2 | 244 | | 160, 160 |
| 3 | Stannous octoate (2.0) | 0-1012, 2-97000 | 0.3 | 75 | | 157, 160 |
| 4 | 2:1 DETA/Stannous octoate (2.0)[f] | 0-925, 2-1860, 4-2250 | 4.5 | 463 | | 160 |
| 5 | 2:1 DETA/Stannous octoate (4.0) | 0-925, 2-2140, 4-2600 | 3.5 | 390–450 | | 154, 156 |
| 6 | Trimethoxyboroxine (1.0) | 0-1075, 2-2900, 4-4700 | 1.2 | 415 | | [e] |
| 7 | Trimethoxyboroxine (2.0) | 0-1075, 2-5550, 4-62000 | 0.3 | 130 | | [e] |
| 8 | Tri(m,p)cresyl borate (Borester 8, U.S. Borax Research) (1.0) | 0-1525, 2-2000, 4-2400 | | 553 | | |
| 9 | Borester 8 (2.0) | 0-1625, 2-2050, 4-2520 | | 540 | | 152, 156 |
| 10 | Aluminum triisopropoxide[c] (1.0) | 0-1500, 2-1920, 4-2280 | 6.5 | 224, 230 | | |
| 11 | aluminum triisopropoxide[c] (2.0) | 0-1500, 2-2200, 4-2320 | 6.0 | 358, 365 | | |
| 12 | None | 0-1875, 2-2050, 4-2250, 6-2440 | 14 | 523 | | 156, 160 |
| 13 | Zinc acetylacetonate, Zn(acac)$_2$ (1.0) | 0-2650, 1-2850, 2-3100, 3-3200, 5-3900 | 8.6 | 359 | | 161, 163 |
| 14 | Ferric acetylacetonate, Fe(acac)$_3$ (1.0) | 0-1800, 2-2525, 4-2480 | | 400 | | 157 |
| 15 | Aluminum acetylacetonate, Al(acac)$_3$ (1.0) | 0-2250, 1-2250, 2-2300, 3-2450, 5-2700 | | 460 | | 162 |
| 16 | Chromium acetylacetonate, Cr(acac)$_3$ (1.0) | 0-2400, 1-2400, 2-2400, 3-2400, 5-2700 | | 500 | | 164 |
| 17 | (i-C$_3$H$_7$O)$_2$ Ti(acac)$_2$ (1.0) | 0-2100, 1-2100, 2-2400, 3-2450, 5-2650 | 14 | 359 | | 160 |
| 18 | Triethanolamine | 0-1750, 2-2500, 4-3075 | 5 | 497 | | 155 |

TABLE 6-continued

Borates and Metal Complexes as Accelerators for Diluted Aromatic Amine-cured Epoxy Systems[a]

| Experiment # | Accelerator (phr)[b] | Time (Hours) - Brookfield (Viscosity (mPa · s) | Pot Life, Hr.[d] | 149° C. Gel Time, Sec. | 171° C. Gel Time, Sec. | HDT, °C. |
|---|---|---|---|---|---|---|
|  | titanate (1.0) |  |  |  |  |  |
| 19 | Ferrous naphthenate (1.0) | 0-2050, 2-3050, 4-2900 |  | 436 |  | 157 |
| 20 | Stannous ethylene glycoxide (FASCAT 2002, M and T Chemicals)[c] (1.0) | 0-2250, 2-2250, 4-2600, 6-2800 | 14 | 478 |  | 159 |
| 21 | Diisopropoxyaluminum ethyl acetoacetate complex (AIEM, Chattem Chem) (1.0) | 0-1600, 2-2350, 4-2280 |  | 360 |  | 154 |
| 22 | Di(sec-butoxy)aluminum ethyl acetoacetate complex (ASEM, Chattem Chem) (1.0) | 0-1700, 2-2300, 4-2800 | 5.2 | 378 |  | 148, 153 |
| 23 | OAO (Chattem Chem) (1.0) | 0-1825, 2-2550, 3-2560 | . | 419 |  | 156 |
| 24 | Stannous octoate (1.0) | 0-2025, 2-2700, 4-4150, 6-5700 |  | 280 |  | 159 |
| 25 | Dibutyltindilaurate (1.0) | 0-1875, 2-2050, 4-2440, 6-2660 | 10.4 | 465 |  | 161 |
| 26 | Aluminum octoate[c] (1.0) | 0-1925, 2-2100, 4-3050, 6-3225 |  | 515 |  | 158 |
| 27 | Aluminum acetylacetonate (1.0) o-cresol novolac (CRJ 106, Schenectady Chem) (3.0) | 0-3100, 2-3600, 4-4650, 6-5200 | 7 | 250 |  | 155 |
| 28 | (i-$C_3H_7O$)$_2$ Ti(acac)$_2$ (2.0) | 0-1175, 2-2000, 4-2100, 6-2300 | 5.4 | 287 | 163 | 137 |
| 29 | Cresyl titanate monomer (Dynamit Nobel) (2.0) |  |  | 247 | 130 | 152 |
| 30 | Zirconium acetylacetonate, Zr(acac)$_4$ (2.0) | 0-1275, 2-1680, 4-2200, 6-2600 | 5.4 | 334 | 220 | 145, 147 |
| 31 | Zn($S_2CN(CH_3)_2$)$_2$[c] (2.0) | 0-1500, 2-2200, 4-3400, 6-3600 | 3.8 | 275 | 135 | 152, 153 |
| 32 | Zn($S_2CN(CH_2C_6H_5)_2$)$_2$[c] (2.0) | 0-1650, 2-3100, 4-3100, 6-3600 |  | 296 | 160 | (e) |
| 33 | Zn salt of mercapto-benzothiazole[c] (2.0) | 0-1600, 2-2600, 4-2700, 6-2700 |  | 325 | 152 | 150 |

[a]System composition (parts):

| Resin Component | | Curing Agent Component | |
|---|---|---|---|
| Epoxy Resin B | 100 | Curithane 103 | 15.4 |
| Styrene | 12 | BABA | 12.6 |
| Accelerator | As indicated | TMPTMA | 17.5 |
| Lupersol 101 | 0.5 | | |

-Brookfield viscosities were determined at room temperature (23-25° C.)
[b]Parts per hundred parts of Epoxy Resin B in system.
[c]Accelerator was not completely soluble in resin component at level used; accelerated resin component was used as suspension.
[d]Time required for Brookfield viscosity to double.
[e]Bar castings (cured 2 hours at 150° C.) were full of voids.
[f]DETA = diethylene triamine.

EXAMPLE 7

Melted C103 and BABA were mixed with BF$_3$ diethyl etherate, BF$_3$ monoethylamine complex, or metal tetrafluoroborates, and then with TMPTMA (Table 7) in order to produce a viscous liquid curing agent mixture. Epoxy Resin B, styrene, and Lupersol 101 were mixed together (Table 7) at room temperature to form a diluted resin. The diluted resin and accelerated curing agent mixtures were then mixed together at room temperature. Gel times were determined on hot plates at 149° C. or 171° C. Brookfield (or Ubbelohde) viscosity was determined periodically for the resin-curing agent mixtures. After the mixtures had stood at room temperature for several hours, some were used to make bar castings as in Example 1. The bar castings were cured for 2 hours at 150° C. HDT values for the castings are shown in Table 7.

"Pot life" (approximate time required for doubling of viscosity at room temperature) was determined for many of the experiments in Tables 6 and 7 from the viscosity-time data given.

TABLE 7

BF$_3$ Complexes and Metal Tetrafluoroborates as Accelerators for Diluted Aromatic Amine Cured Epoxy Systems

| Experiment # | Accelerator (phr) | Time (Hours) - Brookfield (Viscosity (mPa · s) | Pot Life, Hr[d] | 149° C. Gel Time, Sec. | 171° C. Gel Time, Sec. | HDT, °C. |
|---|---|---|---|---|---|---|
| 1 | None | 0-430, 2-415 |  | 453 | 242 | 159, 162 |
| 2 | None | 0-785, 3-875, 6-900 |  | 460 |  |  |
| 3 | None | 0-800, 2-825, 4-875, 6-900 | 20? | 465 | 390 |  |
| 4 | None | 0-750, 2-825, 4-950, 5.25-1050 | 10 | 490-540 |  |  |
| 5 | $CH_3CH_2NH_2BF_3$ (0.17) | 0-800, 2-875, 4-900, 6-1463 | ~7 | 286 | 163 |  |
| 6 | $CH_3CH_2NH_2BF_3$ (0.33) | 0-825, 2-713[e], 4-675, 6-2000 | ~5 | 184 | 101 |  |
| 7 | $CH_3CH_2NH_2BF_3$ (0.5) | 0.925, 2-575[e], 4-1150, 6-3600 | <5 | 130 | 63 |  |
| 8 | $CH_3CH_2NH_2BF_3$ (1.0) |  |  | 119 | 54 |  |
| 9 | $(CH_3CH_2)_2O.BF_3$ (0.1) | 0-875, 2-975, 4-1013, 525-1100 | 10 | 380-400 |  |  |
| 10 | $(CH_3CH_2)_2O.BF_3$ (0.17) | 0.750, 3-963, 6-1125 | 9 | 386 |  |  |
| 11 | $(CH_3CH_2)_2O.BF_3$ (0.2) | 0-875, 2-963, 4-1225, 5.25-1325 | 7.5 | 225-260 |  |  |
| 12 | $(CH_3CH_2)_2O.BF_3$ (0.33) | 0-725, 2-875, 4-1225, 6-6000 | >4 | 80 | 37-49 |  |
| 13 | $(CH_3CH_2)_2O.BF_3$ (0.33) | 0-788, 3-875, 6-5850 | ~3 | 100 |  |  |

TABLE 7-continued

BF$_3$ Complexes and Metal Tetrafluoroborates as Accelerators for Diluted Aromatic Amine Cured Epoxy Systems

| Experiment # | Accelerator (phr) | Time (Hours) - Brookfield (Viscosity (mPa · s) | Pot Life, Hr[d] | 149° C. Gel Time, Sec. | 171° C. Gel Time, Sec. | HDT, °C. |
|---|---|---|---|---|---|---|
| 14 | (CH$_3$CH$_2$)$_2$O.BF$_3$ (0.5) | 0-430, 2-1400, 5-5000 | 1.2 | 62 | 29 | 162, 163 |
| 15 | (CH$_3$CH$_2$)$_2$O.BF$_3$ (0.5) | 0-763, 3-3450, 6-40000 | 1 | 45 | | |
| 16 | (CH$_3$CH$_2$)$_2$O.BF$_3$ (0.67) | 0-712, 2-630[e], 4-gelled (hot) | | | 23-30 | |
| 17 | (CH$_3$CH$_2$)$_2$O.BF$_3$ (1.0) | 0-762, 2-gelled (hot) | | | 12-15 | |
| 18 | (CH$_3$CH$_2$)$_2$O.BF$_3$ (1.0) + C$_6$H$_5$N(CH$_3$)$_2$ (0.85) | gelled after 2 hours | | | | |
| 19 | None | 140-946, 265-1009, 385-1083[c] | ~20 | 562 | | |
| 20 | (CH$_3$CH$_2$)$_2$O.BF$_3$ (0.33) | 125-1603, 280-3466, 335-4432, 405-6676[c] | 2.5 | 81 | | |
| 21 | 45% aq. Cu(BF$_4$)$_2$ (1.0) | 120-1835, 275-3671, 335-5531, 395-8216[c] | 3.5 | 76 | | |
| 22 | 40% aq. Zn(BF$_4$)$_2$ (0.5) | 135-1817, 295-4134, 355-6356, 405-8454[c] | 3.0 | 85 | | |

Footnotes to Table 7
[a] System composition (parts):

| Resin Component | | Curing Agent Component | |
|---|---|---|---|
| Epoxy Resin B | 100 | Curithane 103 | 15.2 |
| Styrene | 15 | BABA | 12.8 |
| Lupersol 101 | 0.5 | Acclerator | As indicated |
| | | TMPTMA | 15.0 |

In curing agent preparation, molten Curithane 103 and BABA were mixed at 100° C.; accelerator was added and the mixture was heated to 150° C. with periodic shaking to dissolve any precipitate which formed. The mixture was then cooled to 80° C.; TMPTMA was added and the mixture was shaken until homogeneous. Brookfield viscosities were determined at room temperature (23-25° C.).
[b] Parts per hundred parts Epoxy Resin B in system.
[c] Time (minutes) - Ubbelohde (25° C.) viscosity (mPa · s).
[d] Time required for Brookfield or Ubbelohde viscosity to double.
[e] Some Brookfield viscosities for some samples were lower than viscosities determined at earlier times because of temperature rise.

EXAMPLE 8

A batch of diluted epoxy resin was prepared by mixing 100 parts of Epoxy Resin B, 15 parts of styrene and 0.5 part of Lupersol 101. A batch of curing agent was prepared by mixing together 15.2 parts of molten Curithane 103, 12.8 parts of molten BABA, and 15 parts of TMPTMA. The following mixture was prepared as a resin batch for a pultrusion experiment: (All parts are by weight)
  115.5 parts Diluted Resin Mixture (prepared above)
  43 parts Curing Agent Mixture (prepared above)
  15.8 parts ASP 400 (clay filler, Engelhard Minerals & Chemicals Corp.)
  4.75 parts Vybar 825 (α-olefin oligomer, Bareco Division, Petrolite Corporation).
This mixture was put into a resin bath through which were passed 60 strands of Owens-Corning OCF 432BC fiberglass. The resin-wet fiberglass was then passed through a pultrusion die at the rate of 26 cm/min. The cross-section of the die was 2.54cm×0.32cm, and the length of the die was 122 cm. The temperature in the center of the die was 195° C. Pultruded stock obtained from the material exiting the die was postcured under different conditions and tested for short beam shear strength at room temperature and 121° C. Data for these samples are given in Table 8.

TABLE 8

Postcure Schedule versus Short Beam Shear Strength for Pultruded Stock from Example 8

| Postcure Schedule | Short beam shear, Room Temp., MPa | Short beam shear, 121° C., MPa |
|---|---|---|
| None | 69.2 | 34.0 |
| 2 hours @ 150° C. | 69.4 | 41.0 |
| 2 hours @ 175° C. | 69.7 | 42.7 |
| 2 hours @ 200° C. | 67.9 | 41.8 |

EXAMPLE 9

Melted C103 and BABA were mixed with three different acrylic monomers (Table 9) to produce viscous liquid curing agent mixtures. Epoxy Resin B, divinylbenzene, Lupersol 101 and benzoquinone (as inhibitor) were mixed to form a diluted resin. The diluted resin and curing agent mixtures were then mixed together at room temperature. Brookfield viscosity was determined for the resin-curing agent mixtures; gel time was determined on a hot plate at 150° C. The mixtures were used to make bar and sheet castings as in Example 1. The castings were cured for 1 hour at 100° C., hour at 150° C. and 1 hour at 171°-175° C. Mechanical properties of the castings are listed in Table 9.

TABLE 9

Aromatic Amine Cured Epoxy Systems Diluted with Divinylbenzene and Different Acrylic Monomers[a]

| Acrylic Monomer | Neopentyl glycol dimethacrylate | Isobutyl methacrylate | Hydroxypropyl methacrylate |
|---|---|---|---|
| Acrylic monomer, phr[b] | 7.5 | 3.75 | 7.5 |
| Room temp. Brookfield viscosity, mPa · s | 800 | 900 | 850 |
| 150° C. Gel time, sec. | 455 | 430 | 380 |
| Heat deflection temp., °C. | 165,165 | 161,164 | 163,165 |
| Dynamic mechanical Tg, °C. (tan δ peak, Rheometrics) | 189 | 187 | 184 |
| Room temp. tensile | 63 | 60 | 68 |

TABLE 9-continued

Aromatic Amine Cured Epoxy Systems Diluted with
Divinylbenzene and Different Acrylic Monomers[a]

| Acrylic Monomer | Neopentyl glycol dimethacrylate | Isobutyl methacrylate | Hydroxypropyl methacrylate |
|---|---|---|---|
| strength, MPa | | | |
| Room temp. tensile modulus, MPa | 2900 | 3090 | 3020 |
| Room temp. tensile elongation, % | 3.2 | 3.1 | 3.5 |
| 149° C. tensile strength, MPa | 29 | 27 | 22 |
| 149° C. tensile modulus, MPa | 1330 | 1260 | 1190 |
| 149° C. tensile elongation, % | 5.8 | 5.8 | 7.2 |

[a]System composition (parts by weight)

| Resin Component | | Curing agent Component | |
|---|---|---|---|
| Epoxy Resin B | 100 | Curithane 103 | 15.2 |
| DVB-55 | 18 | BABA | 12.8 |
| Lupersol 101 | 0.4 | Acrylic monomer | As above |
| Benzoquinone | 0.015 | Hydroquinone | 1000 ppm on monomer |

[b]Parts per hundred parts Epoxy Resin B in system.

I claim:

1. A composition comprising:
   (1) from about 50 to about 99 weight percent, based on the weights of components (1) and (2), of a polyepoxide containing at least one vicinal epoxy group per molecule;
   (2) from about 1 to about 50 weight percent of a blend comprising
      (a) from about 5 to about 70 weight percent of at least one unsaturated aromatic monomer, and
      (b) from about 30 to about 95 weight percent of at least one ester selected from acrylate esters or methacrylate esters;
   (3) a curing amount of an aromatic amine curing agent present in an amount from about 0.50 to about 1.75 chemical equivalents of the aromatic amine per chemical equivalent of polyepoxide, wherein the aromatic amine curing agent is selected from the group consisting of primary and secondary aromatic polyamines; and
   (4) a peroxide initiator.

2. The composition of claim 1 wherein the polyepoxide is a glycidyl polyether of a polyhydric phenol.

3. The composition of claim 1 wherein the polyepoxide is a glycidyl polyether of 2,2-bis(4-hydroxyphenyl)propane.

4. The composition of claim 1 wherein the unsaturated aromatic monomer is styrene.

5. The composition of claim 1 wherein the unsaturated aromatic monomer is a mixture of styrene and divinylbenzene.

6. The composition of claim 1 wherein the ester is hydroxypropyl methacrylate.

7. The composition of claim 1 wherein the ester is isobutyl methacrylate.

8. The composition of claim 1 wherein the ester is a poly ester of a polyacrylate or polymethacrylate.

9. The composition of claim 8 wherein the polymethacrylate ester is trimethylolpropane trimethacrylate.

10. The composition of claim 8 wherein the polymethacrylate ester is neopentyl glycol dimethacrylate.

11. The composition of claim 1 wherein the aromatic amine curing agent is selected from the group consisting of meta-phenylene diamine, 4,4'-methylene dianiline, 2,6-diaminopyridine, 2,4-bis-(p-aminobenzyl)aniline, 4,4'-oxydianiline, 4-bromo-1,3-diaminobenzene, 1,3-diamino-2,4-diethyl-6-methylbenzene, 2,4-toluenediamine and mixtures thereof.

12. The composition of claim 1 wherein the aromatic amine curing agent is a primary aromatic polyamine.

13. The composition of claim 1 wherein the aromatic amine curing agent comprises 4,4'-methylenedianiline.

14. The composition of claim 1 wherein the aromatic amine curing agent comprises 2,4-bis(p-aminobenzyl)aniline.

15. The composition of claim 1 wherein the aromatic amine is 2,4-bis(p-aminobenzyl)aniline.

16. The composition of claim 1 wherein the aromatic amine is 4,4'-methylenedianiline.

17. The composition of claim 1 wherein the peroxide is 2,5-bis(t-butylperoxy)-2,5-dimethylhexane.

18. The composition of claim 1 wherein an epoxy curing accelerator is employed.

19. The composition of claim 18 wherein the epoxy curing accelerator is an organic boric acid ester.

20. A composition comprising:
   (1) from about 50 to about 85 weight percent, based on the weights of components (1) and (2), of a polyepoxide containing at least one vicinal epoxy group per molecule;
   (2) from about 15 to about 50 weight percent of a blend comprising
      (a) from about 5 to about 70 weight percent of at least one unsaturated aromatic monomer, and
      (b) from about 30 to about 95 weight percent of at least one ester selected from acrylate esters or methacrylate esters;
   (3) a curing amount of an aromatic amine curing agent present in an amount from about 0.50 to about 1.75 chemical equivalents of the aromatic amine per chemical equivalent of polyepoxide, wherein the aromatic amine curing agent is selected from the group consisting of primary and secondary aromatic polyamines; and
   (4) a peroxide initiator.

21. The composition of claim 20 wherein the aromatic amine curing agent is a primary aromatic polyamine.

22. The composition of claim 18 wherein the aromatic amine curing agent comprises 4,4'-methylenedianiline.

23. The composition of claim 22 wherein the aromatic amine curing agent further comprises 2,4-bis(p-aminobenzyl)aniline.

24. A process for preparing rods which comprises impregnating a fibrous material with the composition of claim 1.

25. The process of claim 22 wherein the fibrous material is glass fibers.

* * * * *